Figure 1:
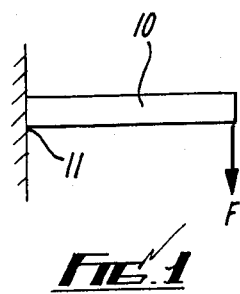

United States Patent [19]

Whipp

[11] Patent Number: 4,686,787

[45] Date of Patent: Aug. 18, 1987

[54] FISHING RODS

[76] Inventor: Nicolas P. L. Whipp, Penrhynmawr, Bwlchtocyn, Pwllheli, Gwynedd LL53 7BU, Wales

[21] Appl. No.: 831,727

[22] Filed: Feb. 21, 1986

[30] Foreign Application Priority Data

Feb. 28, 1985 [GB] United Kingdom ............... 8505223
Mar. 9, 1985 [GB] United Kingdom ............... 8506173
Feb. 3, 1986 [GB] United Kingdom ............... 8602581

[51] Int. Cl.$^4$ ........................................... A01K 87/00
[52] U.S. Cl. ........................................ 43/18.1; 43/18.5
[58] Field of Search ........................... 43/18.1, 18.5

[56] References Cited

U.S. PATENT DOCUMENTS

| | | | |
|---|---|---|---|
| 1,073,260 | 9/1913 | Long | 43/18.1 |
| 2,929,409 | 3/1960 | Waehner | 43/18.5 X |
| 3,401,482 | 9/1968 | Burns | 43/18.1 X |
| 3,461,593 | 8/1969 | Martuch et al. | 43/18.5 |
| 4,015,360 | 4/1977 | Herter | 43/18.5 |
| 4,214,395 | 7/1980 | Caldwell, Jr. | 43/18.1 |
| 4,422,259 | 12/1983 | Shimano | 43/18.1 |

FOREIGN PATENT DOCUMENTS

| | | | |
|---|---|---|---|
| 298719 | 10/1936 | Italy | 43/18.1 |
| 1172665 | 12/1969 | United Kingdom | 43/18.1 |
| 1172666 | 12/1969 | United Kingdom | 43/18.1 |

*Primary Examiner*—Nicholas P. Godici
*Assistant Examiner*—Carmine Cuda
*Attorney, Agent, or Firm*—William R. Hinds

[57] ABSTRACT

A fishing rod or rod section has a cross-section shaped to reduce lateral bending. The second moment of area in respect to lateral bending is greater than the second moment of area in relation to vertical bending. The cross-section may be hollow, the inner surface defined by two parallel sides connected by part-circular end surfaces there being an outer surface which may be circular or reduced in the region of the sides.

10 Claims, 6 Drawing Figures

FISHING RODS

This invention relates to fishing rods and to sections for assembly into rods, and the term rod is intended to include fishing poles.

According to one aspect of the invention a fishing rod comprises one or more elongate sections, each such section having an integral cross-section shaped to reduce lateral bending during casting, which cross-section is hollow, the hollow being defined by upper and lower parallel inner surfaces connected by curved inner end surfaces which are concave inwardly, the outer surface of the cross-section having curved end faces which are convex outwardly and connected by upper and lower faces which are curved over at least substantial parts of their extents outwardly of said parallel inner surfaces.

The curved end surfaces may be part-circular.

The curved end faces may be part-circular.

The curved end surfaces and the respective curved end face may be parallel.

The parallel inner surfaces may be of equal length.

The upper and lower faces may be curved convex outwardly.

The upper and lower faces may be part-circular.

According to another aspect the invention provides a fishing rod having one or more elongate sections, each such elongate section having an integral cross-section shaped to reduce lateral bending during casting, the cross-section being hollow an having inner upper and lower parallel surfaces connected by inwardly concave curved end surfaces, the cross-section having an outer surface comprising outwardly convex curved end faces connected by upper and lower faces which are curved over at last substantial parts of their extents outwardly of said parallel inner surfaces.

According to a further aspect the invention provides a fishing rod comprising at least one elongate section, each such section being of integral radial cross-section integrally formed of substantially the same material or materials throughout the cross-section, the cross-section being hollow, the hollow being defined by upper and lower parallel opposed inner surfaces intersecting with and connected by opposed inwardly concave curved inner end surfaces, the outer surface of the cross-section having outwardly convex curved end faces connected by upper and lower faces which are curved over at least substantial parts of their extents outwardly of said parallel inner surfaces.

Said end surfaces and said end faces may be circular at least in part, and said upper and lower faces are curved convex outwardly.

Figure 2:
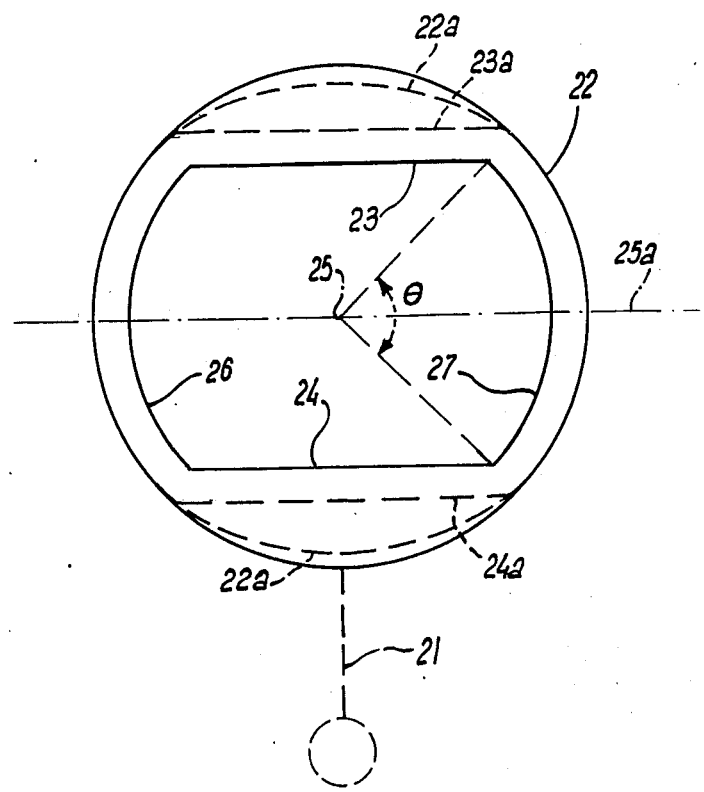
Figure 3:
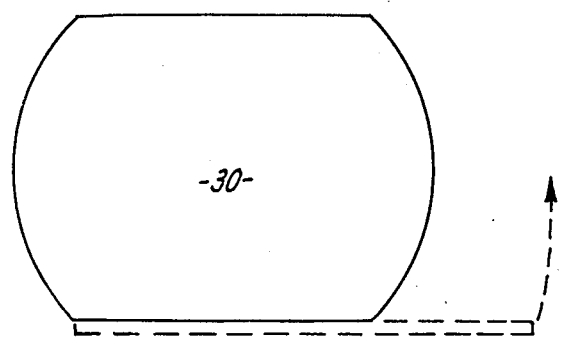
Figure 4:
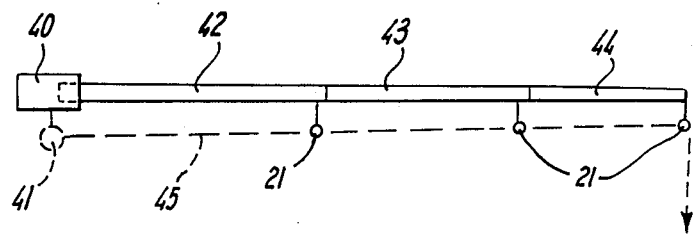
Figure 5:
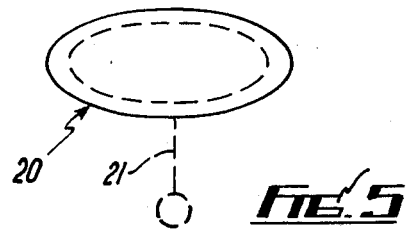
Figure 6:
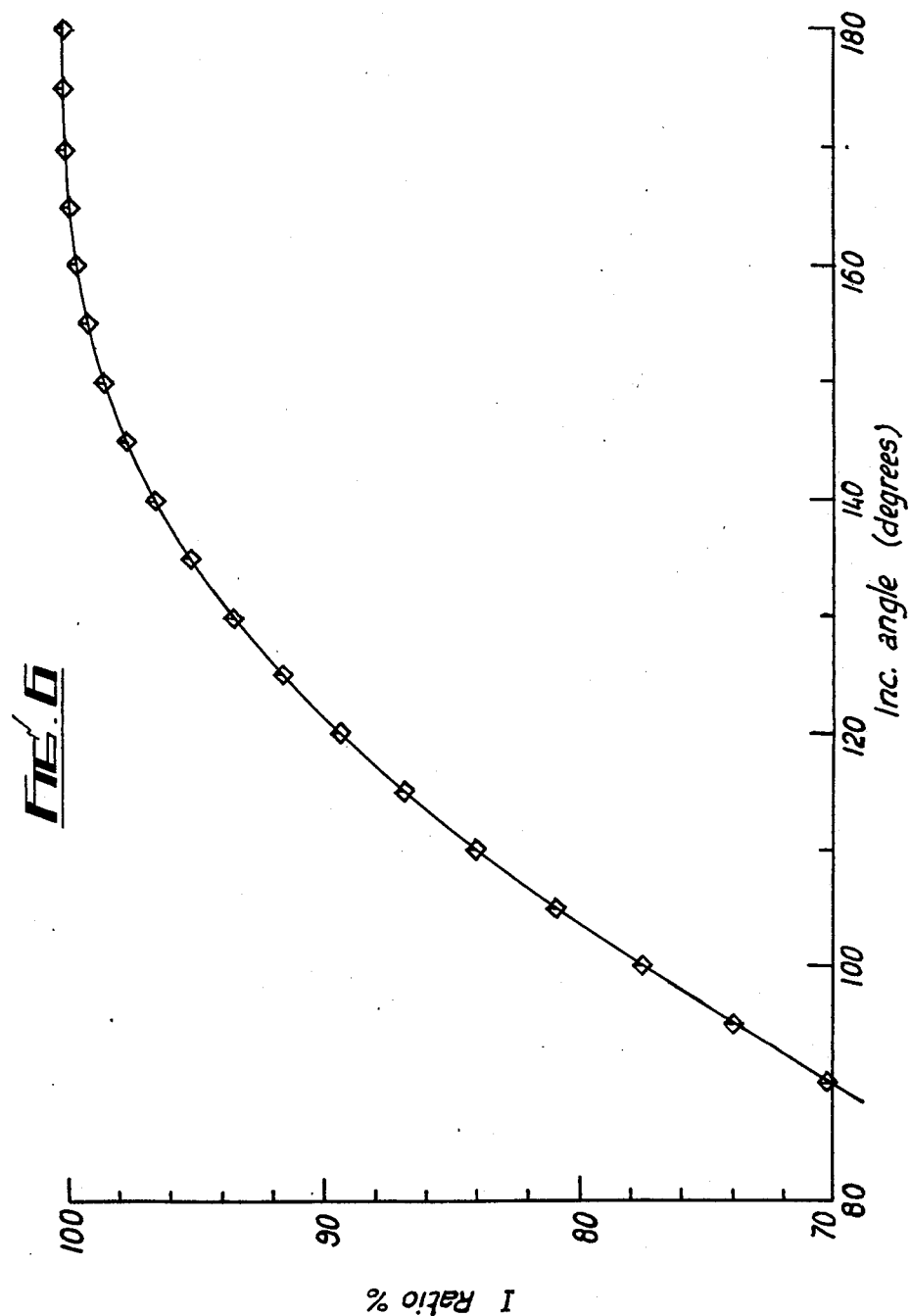

The invention may be performed in various ways and some specific embodiments with possible modifications will now be described by way of example with reference to the accompanying drawings, in which:

FIG. 1 is a side view of a beam;
FIG. 2 is a section through a fishing rod;
FIG. 3 is a section through a mandrel;
FIG. 4 is a side view of a rod;
FIG. 5 is a section through another rod; and
FIG. 6 is a graph.

Referring to the drawings, FIG. 1 shows a beam 10 fixed at one end 11 and deflected from a horizontal position by a vertical load F at the other end. The beam will bend in the plane of the drawing. There is however a tendency for the beam to bend or buckle in a plane at right angles to the length of the beam and this tendency increases as its width decreases in relation to its height (vertical dimension in the drawing). The resistance of the beam to this lateral bending or buckling is largely dependent on the shape of the cross-section of the beam, more precisely the second moment of area (I) of the cross-section. In the case of a beam of rectangular cross-section the magnitude of the lateral deflection equals c/I where c is a component whose value depends on the material of the beam, the force F, the length of the beam and the manner in which the beam is supported.

Considering now fishing rods, when a cast is made using a rod, the rod is effectively being loaded as a beam, although the rod may not remain in a single plane during the cast. The force applied to the rod during casting is not easy to control or ascertain because of factors such as air resistance, weight of line. For rods of material reinforced with glass fibres and of circular cross-section the second moment of area is the same irrespective of the orientation of the rod cross-section to the plane of the cast.

In the present case the cross-section of the rod or of the rod sections is modified to reduce any tendency for the rod to buckle or deflect sideways during a cast. Examples will now be described.

In FIG. 5 the rod or rod section 20 is solid and has a cross-section which is a regular ellipse. In this case with the major axis horizontal $I = \pi AB^3/64$ where A and B are the major and minor axes. If the section 20 is made hollow as shown dotted then $I = \pi(AB^3 - ab^3)/64$ where a and b are the internal major and minor axes. The major axis is generally horizontal as shown by the vertical eye 21 for the fishing line.

The rod or rod section could be rectangular in cross-section with the major axis horizontal but this is not preferred on aerodynamic grounds. A preferred section is shown in FIG. 2. In this case the exterior 22 is circular and the section is hollow defined by parallel sides 23, 24, equidistant from a centre line 25 and central plane 25a, connected at their ends by circular faces 26, 27 equally spaced from the outer surface 22. The cross-section is symmetrical about the plane 25a and about a plane at right angles to plane 25a and containing line 25, the symmetry being different. With the rod as shown and with a uniform thickness so that the surface 22 adjacent surfaces 23, 24 is at 23a, 24a, and referring to angle θ as shown, for a wall thickness of 1 mm and an external diameter of 10 mm values of I in respect of lateral bending and I in respect of vertical bending are for example

| θ°  | I lateral | I vertical |
|-----|-----------|------------|
| 90  | 283.0     | 198.6      |
| 120 | 288.1     | 257.8      |
| 150 | 289.8     | 282.9      |
| 180 | 289.8     | 289.8      |

Thus the resistance to bending laterally is greater than that to bending vertically (generally the plane of the cast). FIG. 6 gives an indication of the relationship between I vertical/I lateral to θ.

The cross-section of FIG. 2 could be made using a mandrel 30 FIG. 3 of cross-section corresponding to the hollow interior of FIG. 2 and winding thereon one or more turns of a sheet of plastics, e.g. an epoxy resin, reinforced with glass fibres or carbon fibres or boron fibres. Preferably the sheet is of a width to need only one turn. The length of the sheet equals the length of the rod section and the sheet is shaped after being wound on the mandrel to give the desired outer surface cross-section. The final shape might not have a circular outer surface in cross-section, for example it might be reduced opposite the sides 23, 24 as shown dotted at 22a in FIG. 2.

The rod section at its location of greatest width has a greater second moment of area than a rod or rod section of the same length and material with a circular outer surface in cross-section of a diameter equal to the maximum transverse dimension of the rod or rod section.

Other materials and cross-sections can be used. For example the rod need not be hollow.

A typical rod is shown in FIG. 4 having a handle 40 supporting a reel 41 and sections 42, 43, 44 joined together and supporting eyes 21 for the line 45. The sections can be tapered as they extend away from the handle and the respective mandrel 30 would be sized accordingly.

As used herein and in particular in the claims the term rod section is intended to include a pole section.

I claim:

1. A fishing rod comprising one or more elongate sections, each such section having an integral cross-section shaped to reduce lateral bending during casting, which cross-section is hollow, the hollow being defined by upper and lower parallel inner surfaces connected by curved inner end surfaces which are concave inwardly, the outer surface of the cross-section having curved end faces which are convex outwardly and connected by upper and lower faces which are curved over at least substantial parts of their extents outwardly of said parallel inner surfaces.

2. A fishing rod as claimed in claim 1 in which the curved end surfaces are part-circular.

3. A fishing rod as claimed in claim 1 in which the curved end faces are part-circular.

4. A fishing rod as claimed in claim 1 in which the curved end surfaces and the respective curved end face are parallel.

5. A fishing rod as claimed in claim 1 in which the parallel inner surfaces are of equal length.

6. A fishing rod as claimed in claim 1 in which the upper and lower faces are curved convex outwardly.

7. A fishing rod as claimed in claim 6 in which the upper and lower faces are part-circular.

8. A fishing rod having one or more elongate sections, each such elongate section having an integral cross-section shaped to reduce lateral bending during casting, the cross-section being hollow and having inner upper and lower parallel surfaces connected by inwardly concave curved end surfaces, the cross-section having an outer surface comprising outwardly convex curved end faces connected by upper and lower faces which are curved over at least substantial parts of their extents outwardly of said parallel inner surfaces.

9. A fishing rod comprising at least one elongate section, each such section being of integral radial cross-section integrally formed of substantially the same material or materials throughout the cross-section, the cross-section being hollow, the hollow being defined by upper and lower parallel opposed inner surfaces intersecting with and connected by opposed inwardly concave curved inner end surfaces, the outer surface of the cross-section having outwardly convex curved end faces connected by upper and lower faces which are curved over at least substantial parts of their extents outwardly of said parallel inner surfaces.

10. A fishing rod as claimed in claim 9 wherein said end surfaces and said end faces are circular at least in part, and said upper and lower faces are curved convex outwardly.

* * * * *